July 15, 1952  A. ISAAC  2,603,104
BICYCLE PEDAL
Filed July 28, 1947  3 Sheets-Sheet 1

INVENTOR
AUGUSTIN ISAAC
BY
Soulmin & Soulmin
ATTORNEYS

July 15, 1952  A. ISAAC  2,603,104
BICYCLE PEDAL
Filed July 28, 1947  3 Sheets-Sheet 2
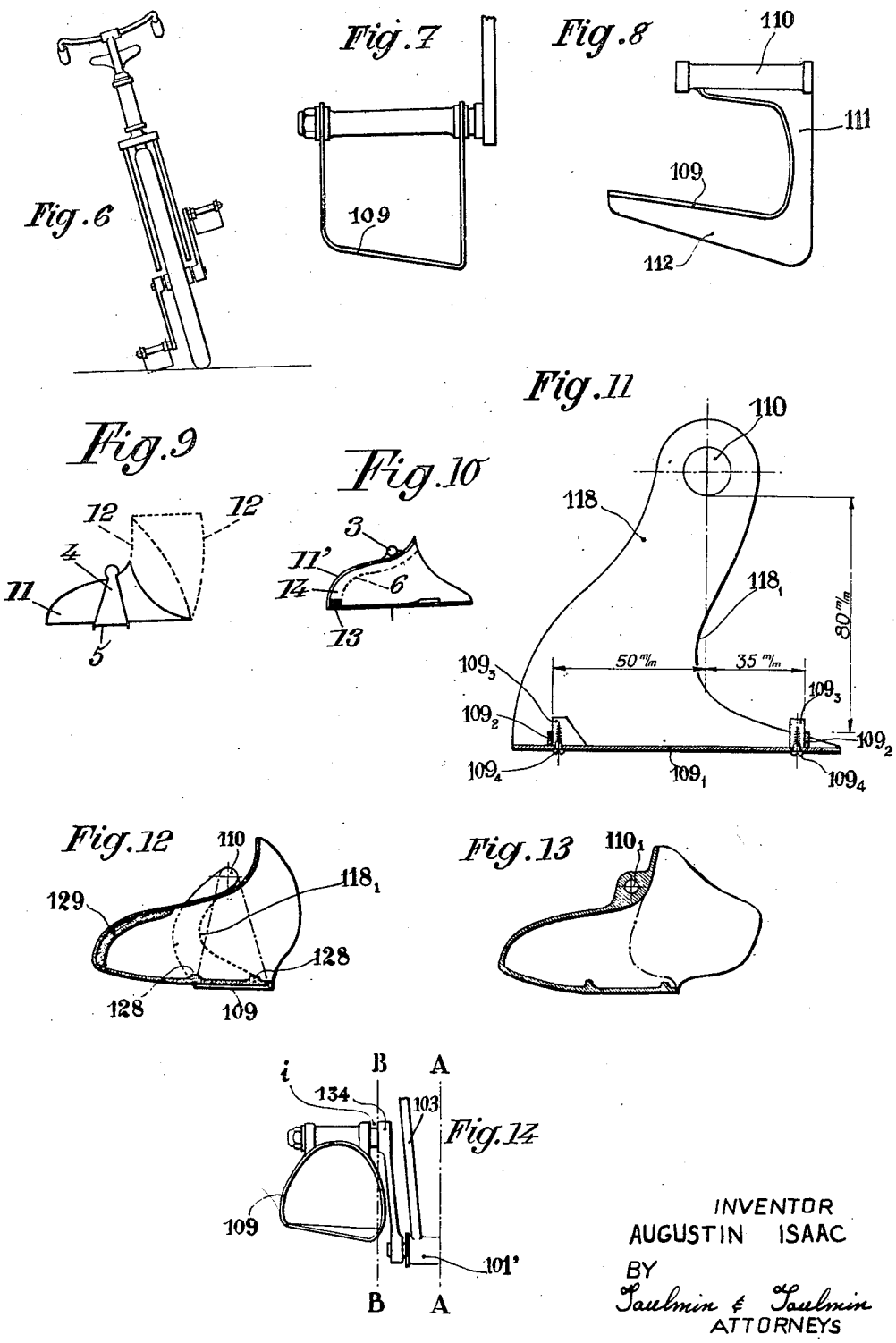
INVENTOR
AUGUSTIN ISAAC
BY
Saulmin & Saulmin
ATTORNEYS July 15, 1952   A. ISAAC   2,603,104
BICYCLE PEDAL
Filed July 28, 1947   3 Sheets-Sheet 3
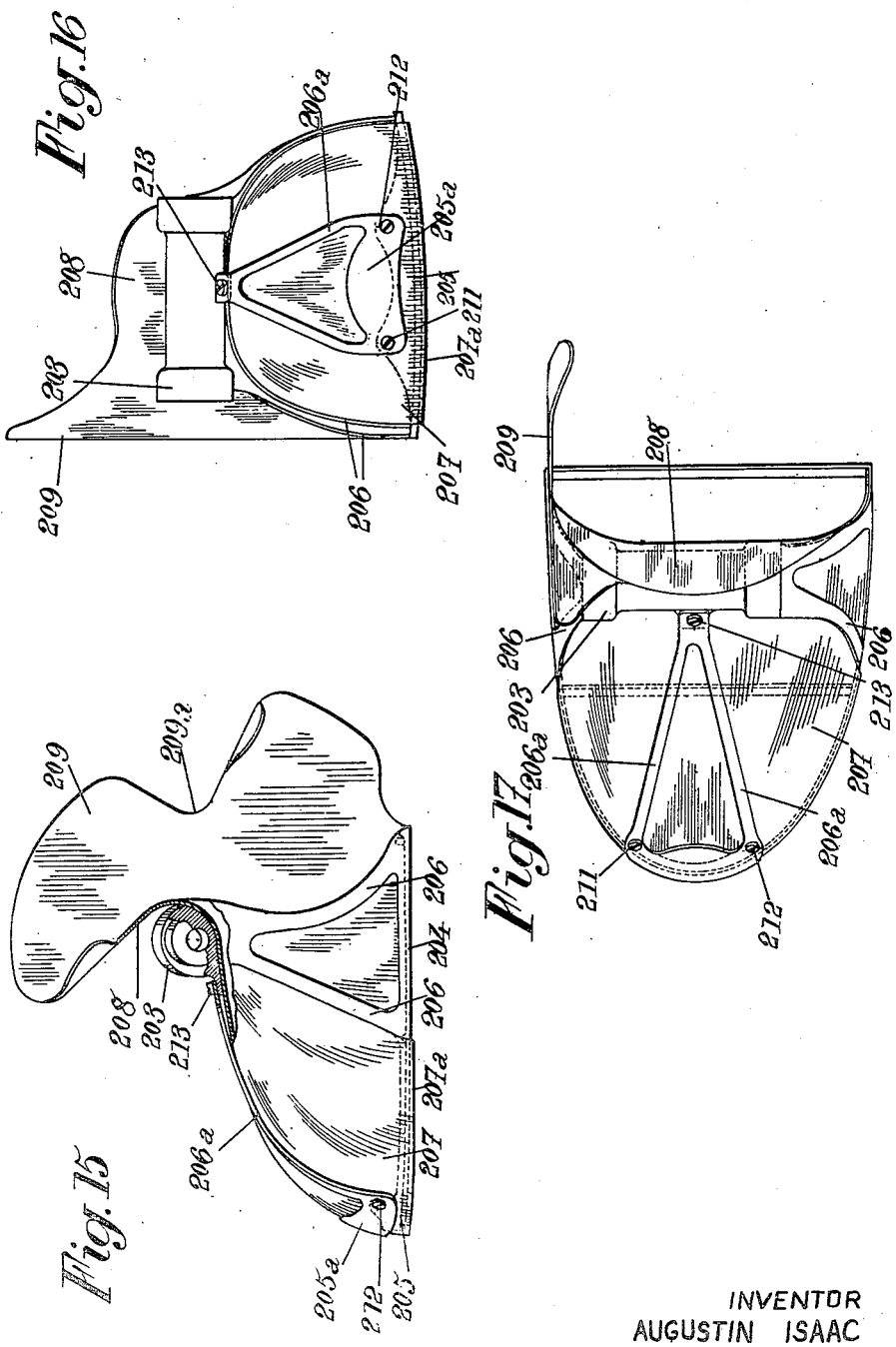
INVENTOR
AUGUSTIN ISAAC
BY
Toulmin & Toulmin
ATTORNEYS Patented July 15, 1952

2,603,104

UNITED STATES PATENT OFFICE 2,603,104

BICYCLE PEDAL

Augustin Isaac, Lyon, France

Application July 28, 1947, Serial No. 764,227
In France February 11, 1944

4 Claims. (Cl. 74—594.6)

The present invention relates to bicycles, and more especially bicycle pedals and its object is to provide a machine of this type which is better adapted to meet the requirements of practice than those made up to this time.

Preferred embodiments of my invention will be hereinafter described with reference to the accompanying drawings, given merely by way of example, and in which:

Fig. 6 is a front view of a bicycle made according to my invention;

Fig. 7 is a front view, on a larger scale, of a pedal made according to a modification;

Fig. 8 is a similar view of another modification;

Fig. 9 is a side view of a foot protecting pedal according to my invention;

Fig. 10 shows a modification of the pedal of Fig. 9;

Figs. 11, 12 and 13 show still other modifications;

Fig. 14 is a front view of another pedal construction according to my invention;

Figs. 15, 16 and 17 are, respectively, a side view, a front view and a top plan view of still another pedal construction according to my invention.

Figure 2:
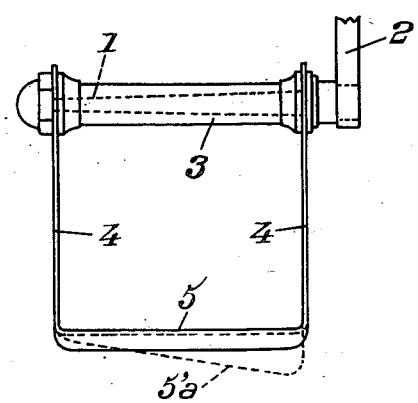
Fig. 2 is a front view, on a larger scale, of a pedal made according to my invention.
Figure 3:
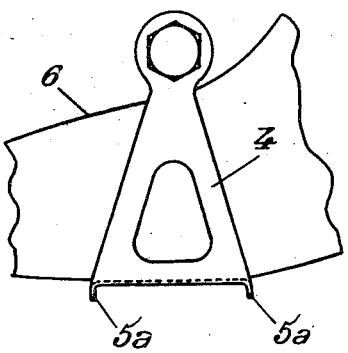
Fig. 3 is a side view corresponding to Fig. 2.

The pedal shown by Figs. 2 and 3 includes a pin or spindle 1 fixed to the end of a crank arm 2 of normal length, for instance by screwing, in the usual way. On this spindle 1 is journalled a pedal hub 3 which may be mounted in the usual fashion, i. e. with ball bearings at either end. To hub 3 is rigidly fixed a kind of U-shaped stirrup including two side plates 4 and a foot bearing surface 5. The dimensions of stirrup 4—5 are such that foot 6 can easily be engaged therein so as to bear upon surface 5. The latter is suitably reinforced so as to be able to support the pedalling pressure.

Figure 1:
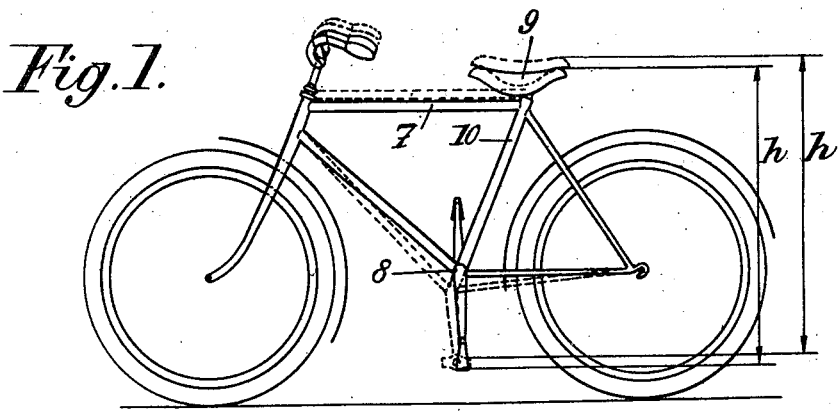
Fig. 1 is a side view of a bicycle made according to my invention.

A bicycle 7 (Fig. 1) provided with such pedals has its crank hanger bearing or box 8 located higher than in an ordinary bicycle, the outline of which is shown in dotted lines. The difference in height is such that in the lowest position of the crank arm the distance between the pedals and the ground is the same in both constructions.

Thus a bicycle according to my invention does not involve more risks of contact between the pedals and the ground than a bicycle of normal type. But my construction has many advantages.

First, as the thickness of plate 5 is substantially smaller than the thickness of an ordinary pedal, for a given clearance between pedal and ground the construction according to my invention permits a substantially lower position of the foot at the bottom of its stroke, the difference averaging from 20 to 25 mm. in practice. For a given height $h$ between the foot bearing surface of the pedal and saddle 9, the bicycle according to my invention is therefore slightly lower. As in an ordinary bicycle having its saddle correctly adjusted in height, the cyclist is seated a bit too high to rest his feet easily upon the ground after leaving the pedals, this difference of height, despite its relatively low value, gives a considerable advantage from the point of view of safety and stability when stopped.

Secondly, the construction according to my invention necessitates a slightly smaller amount of frame tube than the usual construction, that is to say provides an economy and permits a reduction of weight of the bicycle. It should be noted, from this point of view, that if the minimum height of side plates 4 (Fig. 2) is determined by the thickness of the cyclist's foot engaged under hub 3, there is nothing to prevent me, on the contrary, from increasing this height, that is to say from raising bearing 8 (Fig. 1) as much as it may be desired.

Thirdly, my invention permits, without varying the obliquity of saddle tube 10, of moving crank hanger 8 slightly backwards with respect to the vertical line of saddle 9, which is advantageous as bicycle frames are generally defective in that the saddle is normally too much behind the crank hanger.

Fourthly, the pedals are always correctly positioned with respect to the foot without having a tendency to tilt, even when they are fitted with relatively heavy toe clips. It is known that, on the contrary, with ordinary pedals, toe clips cause the pedal to be upside down when empty, since they bring the center of gravity above the pedal axis. It follows that, on the one hand, when empty the toe clips drag upon projections of the ground and are deteriorated, and, on the other hand, when the cyclist climbs into the saddle he experiences difficulties in engaging his feet into the toe clips.

Fifthly, the pedals according to my invention are remarkably well adapted to permit, through "ankle play," the reducing dead center effects to a minimum. They improve pedalling efficiency.

Sixthly, I am no longer limited by space requirements concerning the dimensioning of the pedal hub and its spindle, contrary to what takes place with ordinary pedals the total height of which is to remain very limited.

Seventhly, the pedal according to my invention perfectly holds the foot in lateral positions and avoids any slipping, even with a warped pedal spindle.

Finally, owing to the higher position of crank hanger 8, the chain is located at a higher level, away from water and mud splashes.

My pedal arrangement involves no supplementary articulation nor any modification of the crank arms.

In order to increase its rigidity, bearing plate 5 is provided with stiffening ribs such as $5_a$ (Fig. 3).

As the portion of the pedal that risks coming into contact with the ground is the outer portion thereof, these ribs may be made of greater height on the inner side of the pedal. For instance, as shown by Fig. 2, these ribs have an oblique lower edge as shown at $5'_a$ in dotted lines on Fig. 2.

Figure 4:
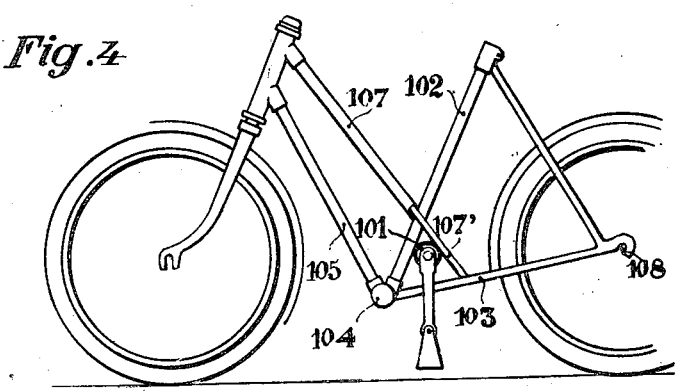
Fig. 4 is a side view of another embodiment of a bicycle according to my invention.
Figure 5:
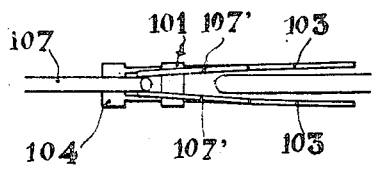
Fig. 5 is a top plan view corresponding to Fig. 4.

In the construction illustrated by Fig. 4, in order to obtain a ladies bicycle frame of improved rigidity fitted with pedals according to my invention, the point of junction of tubes 102, 103 and 105 is located at a lower level than in ordinary cycles. For practical purposes it may be nearly as low as the lowest level of the pedals. This corresponds to giving tube 105 a greater inclination than in usual bicycle frames.

As for tube 107, which, in bicycle frames of conventional constructions, is parallel to tube 105, I preferably give it the inclination it has in ordinary frames, so that it makes an angle with tube 105, and I fit it with two branches 107', in line therewith and extending beyond tube 102 as far as tube 103, at a point located between the ends 104 and 108 of said tube 103. Thus I obtain a very strong and rigid construction without reducing the space provided between tubes 107 and 102 for passage of the cyclist's feet.

The crank hanger 101 is fixed, preferably by welding, in the angle formed by tube 102 and branches 107'.

Preferably, according to a feature of my invention, in order to avoid contact of the outer edge of the pedal with the ground when the bicycle is inclined (as shown by Fig. 6), the foot bearing portion 109 of the pedal is inclined as shown by Fig. 7, i. e. upwardly in the outward direction. This construction permits the locating the crank hanger at a lower level than if surface 9 were horizontal. Advantageously, the outer edge of the pedal is of rounded shape.

Fig. 8 shows a pedal according to my invention in which the outer side plate has been dispensed with, so that the foot bearing portion 109 is connected to the pedal spindle 110 merely through side portion 11. Portion 109 is reinforced by a rib 112 and both portion 109 and rib 112 are inclined as above explained with reference to Fig. 7.

The embodiment of Fig. 8 has both functional and construction advantages. It is very convenient for the cyclist. The lateral inclination of part 109 has no mechanical disadvantages but, on the contrary, has been found to be rather favorable. It prevents slipping of the foot in the outward direction. With this construction, spindle 110 can be made shorter and part 109 located at a smaller distance from this spindle so that the pedal can be adapted to bicycle frames of conventional construction.

Fig. 9 shows a pedal of the kind above described but further provided with a kind of shoe-shaped foot protecting hood 11. This hood, which is for instance fixed by means of screws, nuts or the like, on the bearing plate 5 of the pedal, protects the foot against cold, rain, mud, etc. Hood 11 may be fitted with a flexible protecting flap, for instance of rubber, such as diagrammatically shown at 12, which may even extend rearwardly as far as shown at 12'.

The inside of hood 11 is advantageously lined with heat insulating means. Advantageously its outer surface is streamlined.

I may also make hood 11 sufficiently rigid to constitute the stirrup, thus making it unnecessary to provide side plates 4 and bearing plate 5. Such a construction is diagrammatically illustrated on Fig. 10. The hood then forms a kind of rigid shell 11' secured to the pedal hub 3. Advantageously, the hood is provided, on the inside thereof, with an abutment 13 for the tip of foot 6. I may provide apertures at the front of hood 11' to permit circulation of air in hot weather.

The pedal shown by Fig. 11 includes a base plate $109_1$ supported by said plates 118 pivoted to the pedal spindle 110. Plate $109_1$ is fitted with two transverse ribs $109_2$, one at the front, the other at the rear, the distance from the front one to the vertical plane of spindle 110 being preferably greater (say 50 mm.) than the distance from the rear rib $109_2$ to said vertical plane (35 mm. for a distance of 80 mm. between spindle 110 and the top of ribs $109_2$).

Instead of having the cyclist's foot bearing directly upon these transverse ribs $199_2$, I provide interchangeable pieces $109_3$ fixed, for instance by means of screws $109_4$ against said ribs on the inner face of plate $109_1$. These pieces $109_3$ can be chosen in accordance with the size of the cyclist's foot so as to position it properly with respect to spindle 110.

The front piece $109_3$ has its rear face inclined so that the cyclist's foot is not stopped by said piece when he engages his foot into the pedal.

It should be noted that the provision of pieces $109_3$ between base plate 109 and the cyclist's foot creates under said foot a layer of air which protects it against cold. Furthermore these pieces serve to reduce wear of the shoe.

Advantageously the rear edge of the side plate 118 that is located on the outer side is cut off as shown at $118_1$ so as to facilitate quick lateral disengagement of the foot from the pedal.

A pedal made as shown by Fig. 11 may be provided with a hood (Fig. 12) by fixing upon base plate 109 a hood obtained by stamping of a metal sheet, for instance a sheet of aluminum. In this case the bottom of the hood is provided with two transverse projections 128 adapted to act as bearing pieces for the cyclist's foot. Advantageously also the front part of the hood is provided with a heat insulating lining 29.

Fig. 13 shows an embodiment analogous to the above described Fig. 10, but of a slightly different shape.

Fig. 14 shows a pedal arrangement intended to reduce the transverse distance from the pedals to the plane of symmetry of the bicycles. This arrangement relates to the case of a bicycle in which the tubes 103 extending from the rear wheel to the crank hanger converge frontwardly toward said crank hanger and are therefore oblique with respect to the middle plane of symmetry A—A. The crank arm 134 is then made oblique with respect to the crank shaft axis so as to be parallel to the corresponding tube 103. The stirrup bottom part 109 projects inwardly beyond the plane of rotation B—B of the outer face of the peripheral end of the crank arm.

This arrangement further permits of providing between said outer face of the crank arm and the inner face of the pedal ball bearing a distance $i$ sufficient to permit the use of an ordinary spanner in order to unscrew the pedal spindle and this without modifying the transverse distance between the pedal and the crank hanger.

In the embodiment of Figs. 15–17, the foot protecting hood includes a strong frame, preferably made of a light metal and including the spindle hub 203. The base plate 204 is slightly inclined downwardly and inwardly as shown by Fig. 16. Its front part is provided with a protection plate 205 and with a plurality of arms 206, 206a disposed at intervals relatively important with respect to the width of each of them. These arms serve to connect base plate 204 with hub 203.

This frame may be made by casting or better by stamping, either of steel or of a light metal.

The higher resistance of steel permits the obtaining, even with a thickness of about 1 mm., a sufficient rigidity owing to the curved shape of all the pieces.

I may for instance cut off the base portion and the two lateral arms forming a V of a single piece, then perform the folding while stamping the edge of the base portion to a height of 5 mm. and bring back the ends of the lateral arms under hub 203, constituted by a tube. The ends of the arms are assembled for instance by welding with tube 203 in such manner as to obtain the curvature necessary to prevent injury of the foot.

Preferably I fit on frame 203, 204, 205, 206 a removable element 207 which serves to protect the upper part of the foot. This element 207 is made of any suitable material as Celluloid or rhodoid. Element 207 serves to close the apertures between arm 206, 206a. It can be removed in summer so as to permit cooling of the cyclist's foot.

Element 207 may either protect merely the upper part of the foot or alternatively extend under the sole thereof.

Element 207 may be provided with extensions such as 208 running around hub 203 so as to protect the front portion of the foot up to a greater height. As this extension 208 is flexible it does not trouble the cyclist's foot. Another extension 209 of element 207 is provided laterally on the inner side of the pedal so as to protect the foot and the lower end of the cyclist's trousers against contact with the chain. This extension 209 is preferably cut away at 209a so as to avoid hurting the cyclist's ankle.

Of course I may provide several removable elements 207 of different shapes and thicknesses to correspond to different weather conditions. The fixation of cover element 207 on the frame is made for instance as follows:

The front arm 206a and a portion 205a of the protection plate form a removable triangular system which can be fixed to the frame by three screws 211, 212, 213. Furthermore, cover element 207 is shaped so that once fitted in position its lower edge 207a covers the front edge of base plate 204, holes being further provided in element 207 for passage of the screws 211, 212 through which the portion 205a of the front plate can be fixed to the portion 205 of this plate.

Screw 213 might be replaced by a hinge which would permit of pivoting the whole of 205a, 206a upwardly without detaching it from the frame.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. An underslung cycle pedal comprising a spindle, a hub journaled on said spindle, at least one depending side plate carried by said hub, a base plate carried by said side plate, said base plate being provided with spaced ribs extending transversely thereof for engaging the sole of the cyclist's shoe, said base plate and ribs being inclined upwardly and outwardly, and wherein the distance between said ribs are substantially equal to the distance between the lowermost portion of said base plate and said spindle.

2. An underslung cycle pedal as in claim 1 wherein a hood is provided on the pedal, said hood being adapted to surround the front part of the cyclist's foot, and including a flexible flap which is mounted on the inner side of said pedal to protect that portion of the cyclist's foot not engaged in said hood.

3. An underslung cycle pedal as in claim 1 wherein the length of said base plate in the longitudinal direction is at least equal to the distance between the lowermost portion of said base plate and the axis of said hub.

4. An underslung cycle pedal as in claim 1 wherein the front and rear ends of said base plate extend above the level of the remainder thereof, and wherein the plane passing through the axis of said hub and perpendicular to the longitudinal axis of said base plate intersects said base plate along a line which is located from the rear edge of said base plate a distance at least equal to seventy per cent of the distance from said line to the front edge of said base plate.

AUGUSTIN ISAAC.

REFERENCES CITED

The following references are of record in the file of this patent:

UNITED STATES PATENTS

| Number | Name | Date |
| --- | --- | --- |
| 426,191 | Lloyd et al. | Apr. 2, 1890 |
| 587,536 | Terver | Aug. 6, 1897 |
| 642,770 | Whaley et al. | Feb. 6, 1900 |
| 2,043,759 | Lewis | July 9, 1936 |
| 2,323,913 | Johnson | July 13, 1943 |

FOREIGN PATENTS

| Number | Country | Date |
| --- | --- | --- |
| 13,081 | France | Sept. 30, 1896 |
| 28,328 of 1896 | Great Britain | May 15, 1897 |
| 11,386 of 1902 | Great Britain | Apr. 23, 1903 |
| 505,591 | France | May 10, 1920 |
| 23,743 | France | Aug. 2, 1921 |
| | (1st addition to No. 505,928) | |
| 7,611 | Netherlands | July 7, 1922 |
| 205,395 | Switzerland | Sept. 1, 1939 |